(12) United States Patent
Parkes et al.

(10) Patent No.: US 7,137,116 B2
(45) Date of Patent: Nov. 14, 2006

(54) METHOD AND SYSTEM FOR PERFORMING A TASK ON A COMPUTER

(75) Inventors: Michael A Parkes, Nr. Stourbridge (GB); James R. Larus, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 599 days.

(21) Appl. No.: 09/779,763

(22) Filed: Feb. 8, 2001

(65) Prior Publication Data

US 2001/0005853 A1    Jun. 28, 2001

Related U.S. Application Data

(63) Continuation-in-part of application No. 09/436,618, filed on Nov. 9, 1999.

(60) Provisional application No. 60/196,624, filed on Apr. 12, 2000.

(51) Int. Cl.
*G06F 9/46* (2006.01)
*G06F 12/00* (2006.01)

(52) U.S. Cl. .................. 718/102; 718/100; 711/117

(58) Field of Classification Search ............. 718/100, 718/102, 103, 105, 106; 709/201, 205; 711/117–118, 141
See application file for complete search history.

(56) References Cited

U.S. PATENT DOCUMENTS

| | | | |
|---|---|---|---|
| 5,452,447 A | 9/1995 | Nelson et al. | |
| 5,485,609 A | 1/1996 | Vitter et al. | |
| 5,517,662 A * | 5/1996 | Coleman et al. | 709/201 |
| 5,524,242 A * | 6/1996 | Aida et al. | 717/149 |
| 5,553,305 A | 9/1996 | Gregor et al. | |
| 5,566,321 A * | 10/1996 | Pase et al. | 711/153 |
| 5,768,515 A * | 6/1998 | Choquier et al. | 709/206 |
| 5,796,954 A | 8/1998 | Hanif et al. | |
| 5,828,880 A | 10/1998 | Hanko | |
| 6,003,066 A | 12/1999 | Ryan et al. | |
| 6,088,044 A | 7/2000 | Kwok et al. | |
| 6,119,145 A | 9/2000 | Ikeda et al. | |
| 6,230,190 B1 * | 5/2001 | Edmonds et al. | 709/213 |
| 6,263,358 B1 * | 7/2001 | Lee et al. | 718/100 |
| 6,266,708 B1 | 7/2001 | Austvold et al. | |
| 6,298,382 B1 | 10/2001 | Doi et al. | |
| 6,330,583 B1 * | 12/2001 | Reiffin | 718/105 |
| 6,330,643 B1 | 12/2001 | Arimilli et al. | |

(Continued)

OTHER PUBLICATIONS

Gosling, James, et al., "The Java Language Specification," *Addison Wesley*, (1996).

(Continued)

*Primary Examiner*—Meng-Al T. An
*Assistant Examiner*—Syed J Ali
(74) *Attorney, Agent, or Firm*—Microsoft Corporation

(57) ABSTRACT

A method and system for performing a task on a computer is provided, in which the procedure is organized into multiple stages. Each stage of the task has an associated sub-task. Requests for the procedure are represented by "work packets" that stored in a holding area at each stage, such as a stack or a queue, until it is advantageous for a processor to execute them. Each work packet contains data and/or instructions for performing the sub-task of the stage. When a processor is available, it finds a stage having unexecuted work packets and executes a batch of work packets by repeatedly performing the sub-task of the stage. This repeated execution of a sub-task allows a processor to maximize its native time-saving mechanisms, such as cache. The invention may advantageously be used as an alternative to conventional thread-based programming.

39 Claims, 14 Drawing Sheets

U.S. PATENT DOCUMENTS

| | | | |
|---|---|---|---|
| 6,425,021 | B1 | 7/2002 | Ghodrat et al. |
| 6,496,871 | B1 * | 12/2002 | Koyama et al. ............ 719/317 |
| 6,505,229 | B1 | 1/2003 | Turner et al. |
| 6,633,897 | B1 | 10/2003 | Browning et al. |

OTHER PUBLICATIONS

Ailamaki, Anastassia G., et al., "DBMSs On A Modern Processor: Where Does Time Go?," in the *Proceedings of the 25th International Conference on Very Large Data Bases*, (Sep. 1999), pp. 266-277, Edinburgh, Scotland, UK.

Nikhil, Arvind and Rishiyur S., "I-Structure: Data Structures for Parallel Computing," *ACM Transactions on Programming Languages and Systems*, vol. 11 (4):598-632, (Oct. 1989).

Banga, Gaurav, et al., "Scalable Kernel Performance for Internet Servers Under Realistic Loads," in the *Proceedings of the USENIX 1998 Annual Technical Conferenc*; New Orleans, LO, (1998), pp. 1-12.

Blelloch, Guy E., et al., "Space-Efficient Scheduling of Parallelism with Synchronization Variables," in *Proceedings of the 9th Annual ACM Symposium on Parallel Algorithms and Architectures (SPAA)*; Newport, Rhode Island, (1997), pp. 12-23.

Cao, Q., et al., "Detailed Characterization of a Quad Pentium Pro Server Running TPC-D," in *Proceedings of the International Conference on Computer Design (ICCD)*; Austin, TX, (Oct. 1999), pp. 108-115.

Chilimbi, Trishul, M., et al., "Cache-Conscious Structure Definition," in the *Proceedings of the ACM SIGPLAN '99 Conference on Programming Language Design and Implementation (PLDI)*; Atlanta, GA, (May 1999),, pp. 13-24.

Chilimbi, Trishul, M., et al., "Cache-Conscious Structure Layout," in the *Proceedings of ACM SIGPLAN '99 Conference on Programming Languages Design and Implementation (PLD)*; Atlanta, GA, (May 1999), pp-.12,.

Eickemeyer, Richard, J., et al., "Evaluation of Multithreaded Uniprocessors for Commercial Application Environments," in *Proceedings of the 23rd Annual International Symposium on Computer Architecture*; Philadelphia, PA, (May 1996), pp. 203-212,.

Freeh, Vincent, W., et al., "Distributed Filaments: Efficient Fine-Grain Parallelism on a Cluster Of Workstation," in *Proceedings of the First USENIX Symposium on Operating Systems Design and Implementation (OSDI)*; Monterey, CA, (Nov. 1994), pp. 201-213.

Harel, D., et al., "On the Development of Reactive Systems," in *Logics and Models of Concurrent Systems*, vol. F13, K.R. Apt, Ed. Berlin: Springer-Verlag (1985), pp. 477-498.

Jayasimha, Jay, et al., "Thread-based Cache Analysis of a Modified TPC-C Workload," in *Proceedings of the Second Workshop on Computer Architecture Evaluation Using Commercial Workload*; Orlando, FL. (1999).

Keeton, Kimberly, et al., "Performance Characterization of a Quad Pentium Pro SMP Using OLTP Workloads," in *Proceedings th e25th Annual International Symposium on Computer Architecture*; Barcelona, Spain, vol. 26(3):15-26, (Jun. 1998).

Lamarca, Anthony, et al., "The Influence of Caches on the Performance of Heaps," *The ACM Journal of Experimental Algorithmics*, (1997), pp. 1-32.

Lo, Jack, L., et al., "An Analysis of Database Workload Performance on Simultaneous Multithreaded Processors," in *Proceedings of the 25th Annual International Symposium on Computer Architecture*, Barcelona, Spain, vol. 26(3):39-50, (Jun. 1998).

Maltzahn, Carlos, et al., "Performance Issues of Enterprise Level Web Proxies," in Proceedings of the *1997 ACM Sigmetrics International Conference on Measurement and Modeling of Computer Systems*; Seattle, WA, (Jun. 1997), pp. 13-23.

Morris, Robert, et al., "The Click Modular Router," in *Proceedings of the 17th ACM Symposium on Operating Systems Principles (SOSP '99)*; Charleston, South Carolina, vol. 33(5):217-231 (Dec. 1999).

Pai, Vivek, S., et al., "Flash: An efficient and portable Web Server," in *Proceedings of the 1999 USENIX Annual Technical Conference*; Monterey, CA, (Jun. 1999), pp. 199-212.

Pettis, Karl, et al., "Profile Guided Code Positioning," in *Proceedings of the ACM SIGPLAN '90 Conference on Programming Language Design and Implementation*; White Plans, NY., (Jun. 1990), *Sigplan Notices*, vol. 25(6):16-27.

Philbin, James, et al., "Thread Scheduling for Cache Locality," in *Proceedings of the 7th International Conference on Architectural Support for Programming Languages and Operating systems (ASPLOS VII)*; Cambridge, MA, (Oct. 1996), pp. 60-71.

Ranganathan, Parthasarathy, et al., "Performance of Database Workloads on Shared-Memory Systems with Out-of-Order Performance," in the *Proceedings of the 8th International Conference on Architectural Support for Programming Languages and Operating Systems (ASPLOS VII)*; San Jose, CA., (Oct. 1998), pp. 307-318.

Torrellas, Josep, et al., "Optimizing the Instruction Cache Performance of the Operating System," *IEEE Transactions on Computers*. vol. 47(12):1363-1381, (Dec. 1998).

Wand, Mitchell, "Continuation-Based Multiprocessing," in *Proceedings of the 1980 LISP Conference*; Stanford University, Palo Alto, CA, (Aug. 1980), pp. 19-28.

Hill, Mark, D., et al., "Evaluating Associativity in CPU Caches," *IEEE Transactions on Computers*; vol. 38(12):1612-1630, (1989).

Lee, Edward, A., et al., "Dataflow Process Network," *Proceedings of the IEEE*; vol. 83(5):773-799, (May 1995).

Mogul, Jeffrey, C., et al., "The Effect of Context Switches on Cache Performance," in Proceedings of the Fourth International Conference on Architectural Support for Programming Languages and Operating Systems, Santa Clara, CA, (Apr. 1991), pp. 75-85.

Najjar, Walid A., et al., "Advances in the dataflow computational Model," Parallel Computing, vol. 25, (1999).

Perl, Sharon, et al., "Studies of Windows NT Performance Using Dynamic Execution Traces," in *Proceedings of the 2nd USENIX Symposium on Operating Systems Design and Implementation (OSDI)*; vol. 30, Special Issue (1996), Seattle, WA, (Oct. 1997).

Rosenblum, Mendel, et al., "The Impact of Architectural Trends on Operating System Performance," *Copper Mountain Resort*, CO., (Dec. 1995), pp. 285-298.

Acar, Umut, A., et al., "The Data Locality of Work Stealing," in *Proceedings of the Twelfth Annual ACM Symposium on Parallel Algorithms and Architectures (SPAA 2000)*; Bar Harbor, ME., (Jul. 2000).

Anderson, Thomas E., "The Performance of Spin Lock Alternatives for Shared-Memory Multiprocessors," *IEEE Transaction on Parallel And Distributed Systems*, vol. 1(1):6-16, (1990).

Banga, Gaurav, et al., "Better Operating System Features for Faster Network Servers," in the *Proceedings of the Workshop on Internet Server Performance*; Madison, WI Jun. 1998.

Barroso, Luiz, Andre, et al., "Memory System Characterization of Commercial Workloads," in *Proceedings of The 25th Annual International Symposium on Computer Architecture*; Barcelona, Spain, (Jun. 27-Jul. 1, 1998), pp. 3-14.

Blackwell, Trevor, "Speeding up Protocols for Small Messages," in *Proceedings of ACM SIGCOMM '96 Conference on Applications, Technologies, Architectures, and Protocols for Computer Communications*; Palo Alto, CA, (Aug. 1996), pp. 85-95.

Blumofe, Robert D., et al., "Cilk: An Efficient Multithreaded Runtime System," *Journal of Parallel and Distributed Computing*, vol. 37(1):55-69, (1996).

Chankhunthod, Anawat, et al., "A Hierarachical Internet Object Cache," in *Proceedings of the USENIX 1996 Annual Technical Conference*; San Diego, CA., (Jan. 1996), pp. 153-163.

Draves, Richard, P., et al., "Using Continuations to Implement Thread Management and Communication in Operating Systems," in *Proceedings of the Thirteenth ACM Symposium on Operating Systems Principles*; Pacific Grove, CA., (Oct. 1991), pp. 122-136.

Perl, Sharon, E., et al., "Studies of Windows NT Performance Using Dynamic Execution Traces," in *Proceedings of the Second Symposium on Operating Systems Design and Implementation (OSDI '96)*; Seattle, WA, (Oct. 1996), pp. 169-183.

Chandra, Sandra, et al., "Teapot: A Domain-Specific Language for Writing Cache Coherence Protocols," *IEEE Transactions on Software Engineering*; vol. 25(3):pp317-333, (1999).

Chen, J. Bradley, "Memory Behavior of an X11 Window System," in the *Proceedings of the Winter 1994 USENIX Conference*; San Francisco, CA, (Jan. 1994), pp. 189-200.

Papadimitriou, Christos, "The Theory of Database Concurrency Control," Rockville, MD., Computer Science Press, (1986) pp. 1-234.

Gray, Jim, "The Benchmark Handbook for Database and Transaction Processing Systems," Second Edition, Morgan Kaufmann Publishers, Inc., San Mateo, CA. (1993), pp. 1-586.

Agha, Gul A., "Actors: A Model of Concurrent Computation in Distributed Systems", Cambridge, CA: *MIT Press*, (1988).

Ackerman, William B., et al., "VAL-A Value-Oriented Algorithmic Language: Preliminary Reference Manual," *MIT Laboratory for Computer Science*, Cambridge, MA, MIT/LCS/TR-218, (Jun. 1979).

Patterson, David, A., et al., "Computer Architecture: A Quantitative Approach," 2ed. *Morgan Kaufmann Publishers, San Francisco*, CA (1996), Chapters 3, 4 and 5.

Gray et al., *Transaction Processing: Concepts and Techniques*, Morgan Kaufmann Publishers, San Mateo, CA, pp. 5-22, 115-119, 148-149, 159-174, 221-225, 375-440 (1993).

Levitt, Jason, "Measuring Web-Server Capacity", *Information Week* (1997), printed at spec.org/osg/web96/infoweek on May 15, 2004.

Ousterhout, John, "Why Threads Are a Bad Idea (for most purposes)" Sun Microsystems Laboratories (1995), printed at softpanorama.org/People/Ousterhout/Threads/ on May 10, 2004.

Standard Performance Evaluation Corporation, "SPECweb96 Release 1.0" (1997), printed at spec.org/osg/web96/runrules. html; . . . /web96/webpaper.html; . . . web96/workload.html; . . . /web96/notes.html; . . . /web96/results/res2000q1 on May 10, 2004.

Y. Oyama, K. Taura and A. Yonezawa; Executing Parallel Programs with Synchronization Bottlenecks Efficiently; Jul. 1999; Tokyo.

* cited by examiner

```
                              const int MaxChildren= 4;

class MY_STAGE : public STAGE
{
public:
  MY_STAGE() :
    STAGE ("HelloWorldStage", ExclusiveStage, False, 0, 0, DefaultTimer, True, StageBatchSize)
    { }
};

MY_STAGE MyStage;        // Instance of stage used to execute operations class MY_PACKET : public CLOSURE<MY_PACKET>
{
public:
  RESULT<INT> Children[MaxChildren];
  int Number;

MY_PACKET() : { }

MY_PACKET(int NewNumber) : Number(NewNumber) {printf("Creating new child %d\n",
Number);}

// Parent Work Packet:
  ACTIONS StartChildren() {
    // Create the children and waiting for them to complete
    for (int Count=0; Count < MaxChildren; Count++) {
  new(NewChild, &MyStage, NoPartitionKey, NoSessionKey, &Children[Count]) MY_PACKET(Count);
      }
    return WaitForChildren(WakeAfterSleep);
  }

// Parent Continuation:
  ACTIONS WakeAfterSleep() {
    // Make sure all children are done
    int Total = 0;
    for (int Count=0; Count < MaxChildren; Count ++) { Total += Children[Count]; } printf("\nAll children have finished.\n\n");

printf("The total of 0 + 1 + 2 + 3 = %d\n\n", Total);

// Quit
    return Complete();
  }

// Child Work Packet:
  ACTIONS NewChild() {
    // Code for a child, which just returns its index
    RESULT<int> Result = Number;
    printf("New child %d is now running\n", Number);
    return Complete(&Result);
  }
    };
```

FIG. 14 though the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the

METHOD AND SYSTEM FOR PERFORMING A TASK ON A COMPUTER

CROSS-REFERENCE TO RELATED APPLICATIONS

This application is a continuation-in-part of U.S. application Ser. No. 09/436,618, filed Nov. 9, 1999, and claims priority to U.S. Provisional Application Ser. No. 60/196,624, filed Apr. 12, 2000. Both of the aforementioned applications are incorporated by reference in their entirety herein.

TECHNICAL FIELD

This invention relates generally to the use of optimization features of processors to speed up program execution, and, more particularly, to the performance of a task on a computer in stages so as to maintain data locality within one or more processors.

BACKGROUND OF THE INVENTION

Server programs are designed to run on server computers for the purpose of executing procedures in response to requests from client programs. During the course of a day, a server program may receive thousands, millions, or even billions of requests from client programs, each request asking for the performance of some task. For each request received, the server program allocates an independent "thread" of execution. A "thread scheduler" running on the server computer executes the thread on the first available processor. The thread is then permitted to use the processor to perform a series of sub-tasks required to perform the overall task and fulfill the request. Examples of sub-tasks include parsing character strings contained in the request, searching a database, and requesting disk I/O. When the thread stops running, either as a result of being suspended by the thread scheduler or by voluntarily giving up control of the processor, the thread scheduler may give control of the processor to another thread. This helps ensure that the processor always has work to do.

Unfortunately, a thread-based approach to processing client requests is often inefficient. Passing control of a processor from thread to thread may cause the processor to switch between unrelated pieces of code, thereby reducing program locality and consequently hindering the processor's native time-saving mechanisms, such caches, translation lookaside buffers and branch predictors. Thread-based programming can create additional problems on multiprocessor systems. For example, running the same thread on several processors can also result in two or more processors attempting to access the same data, thereby requiring the use of such synchronization mechanisms as locks, mutexes and critical sections. Multiple processors trying to access the same data may also have to consume bandwidth and CPU time trying to update one another's cache.

Thus it can be seen that there is a need for a method and system for performing a task on a computer that avoids the above-mentioned disadvantages.

SUMMARY OF THE INVENTION

In accordance with this need, a method and system for performing a task on a computer is provided, in which the procedure is organized into multiple stages. Each stage of the procedure has an associated sub-task. Requests for the procedure are represented by "work packets" that are stored in a holding area at each stage, such as a stack or a queue, until it is advantageous for a processor to execute them. Each work packet contains or references data and/or instructions for performing the sub-task of the stage. When a processor is available, it finds a stage having unexecuted work packets and executes a batch of work packets by repeatedly performing the sub-task of the stage. This repeated execution of a sub-task allows a processor to maximize its native time-saving mechanisms, such as cache. The invention may advantageously be used as an alternative to conventional thread-based programming.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with many computer system configurations, including multi-processor systems, microprocessor based or programmable consumer electronics, network PCs, minicomputers, mainframe computers, and the like. The term "multiprocessor system" as used herein includes systems in which multiple computers are used, systems in which a single computer contains multiple processors, and parallel machines. The invention may also be practiced in distributed computing environments where tasks are performed by remote processing devices that are linked through a communications network. In a distributed computing environment, program modules may be located in both local and remote memory storage devices.

Figure 1:
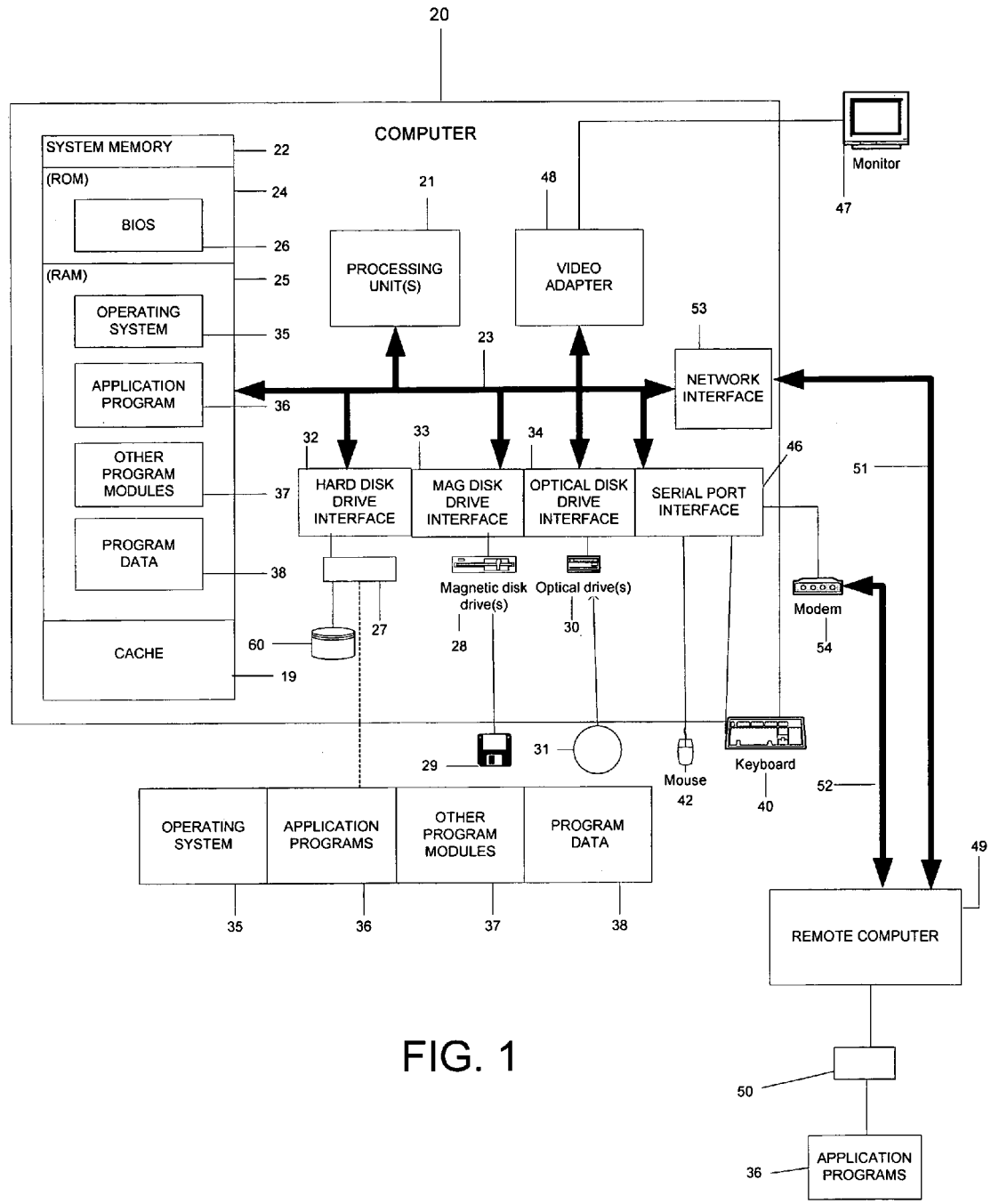
FIG. 1 is an example of a computer system on which the invention may reside.

There are many aspects and possible implementations of the invention that will be discussed below, but first, an example of an environment in which the invention may be employed will be described. With reference to FIG. 1, an exemplary system for implementing the invention includes a general purpose computing device in the form of a conventional computer 20, including one or more central processing units or CPUs 21 processing, a system memory 22, and a system bus 23 that couples various system components including the system memory to the CPUs 21. The system bus 23 may be any of several types of bus structures including a memory bus or memory controller, a peripheral bus, and a local bus using any of a variety of bus architectures. The system memory includes read only memory (ROM) 24 random access memory (RAM) 25 and a cache 19. The cache 19 may be shared among several of the CPUs 21. Additionally, each CPU 21 may have its own dedicated cache (not shown). A basic input/output system (BIOS) 26, containing the basic routines that help to transfer information between elements within the computer 20, such as during start-up, is stored in the ROM 24. The computer 20 may include one or more hard disk drives 27 for reading from and writing to one or more hard disks 60, one or more magnetic disk drives 28 for reading from or writing to one or more removable magnetic disks 29, and one or more optical disk drives 30 for reading from or writing to one or more removable optical disks 31 such as a CD ROM or other optical media.

The hard disk drives 27, magnetic disk drives 28, and optical disk drives 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs hard disks 60, removable magnetic disks 29, and removable optical disks 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disks 60, magnetic disks 29, optical disks 31, ROM 24, RAM 25, or cache 19 including an operating system 35, one or more applications programs 36, other program modules 37, and program data 38. A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, universal serial bus (USB), or dedicated controller. A monitor 47 or other type of display device is also connected to the system bus 23 via an interface, such as a video adapter 48. In addition to the monitor, computers typically include other peripheral output devices, not shown, such as speakers and printers.

The computer 20 may operate in a networked environment using logical connections to one or more remote computers, such as a remote computer 49. The remote computer 49 may be another computer, a server, a router, a network PC, a peer device or other common network node, and typically includes many or all of the elements described above relative to the computer 20, although only a memory storage device 50 has been illustrated in FIG. 1.

The logical connections depicted in FIG. 1 include a local area network (LAN) 51 and a wide area network (WAN) 52. Such networking environments are commonplace in offices, enterprise-wide computer networks, intranets and the Internet. It will be appreciated that the network connections shown are exemplary and other means of establishing a communications link between the computers may be used. When used in a LAN networking environment, the computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the computer 20, or portions thereof, may be stored in the remote memory storage device 50.

The invention is generally directed to a method and system for performing a task on a computer system, in which multiple requests for the task are processed in batches at each computational stage of the task. In an embodiment of the invention, each computational stage is represented by a separate data structure—referred to herein as a "stage object"—and a different sub-task of the overall task is performed at each stage. As used herein, the term "task" refers to any act that can be carried out by one or more processors of one or more computers. A processor on the computer seeks out a stage having a batch of unprocessed requests and, when it finds one, repeatedly performs the sub-task on each request of the batch. This programming model allows the processor to repeatedly execute the same lines of computer code and thereby take advantage of cache locality, branch predictors and the like. It also facilitates good programming practices by encouraging a software developer to logically group related operations into a well-rounded and complete programming abstraction. Furthermore, it may reduce the need for complex synchronization techniques, such as locks and mutexes.

When the invention is implemented on a multiprocessor computer system, the relationship between the number of processors and the number of stages may vary. For example, the work of some stages may be executed by only a single processor at a time, while the work of other stages may be performed by several processors in parallel.

In an embodiment of the invention, data and/or functions that may be used to perform the sub-task associated with each stage are held in a data structure referred to herein as a "work packet." As used in this description and in the claims that follow, the phrases "contained in a work packet," "stored in a work packet," "held in a work packet" and similar expressions include the storage of data and/or functions directly within a work packet data structure as well as the storage of one or more pointers to data and/or functions within a work packet data structure.

To send a batch of requests to a stage, a work packet is allocated for each request and placed in a holding area associated with the stage. The holding area may be implemented as any type of data structure that is capable of holding multiple items, including any type of stack or any type of queue. The holding area may, for example, be implemented as a priority queue. A processor in the computer system then processes each work packet in the batch by performing the sub-task associated with the stage using data and/or functions contained in the work packet.

As described in the background section, the conventional thread-based method for carrying out a task on a computer requires a thread to be allocated for each active client request. Each thread then seeks out an available processor, and uses the processor to seek out the functions and data required for a sub-task, perform the sub-task, seek out another set of functions and data for the next sub-task, and so on, until the thread is suspended. Another thread may then take control of the processor and goes through the same routine. Switching from thread to thread in this manner tends to slow down a processor. In particular, this model of thread-based processing causes unrelated blocks of instructions and data to be brought in and out of the processor's cache, thereby making it necessary for the processor to refresh the cache frequently by reading instructions and data from slower main memory.

Figure 2:
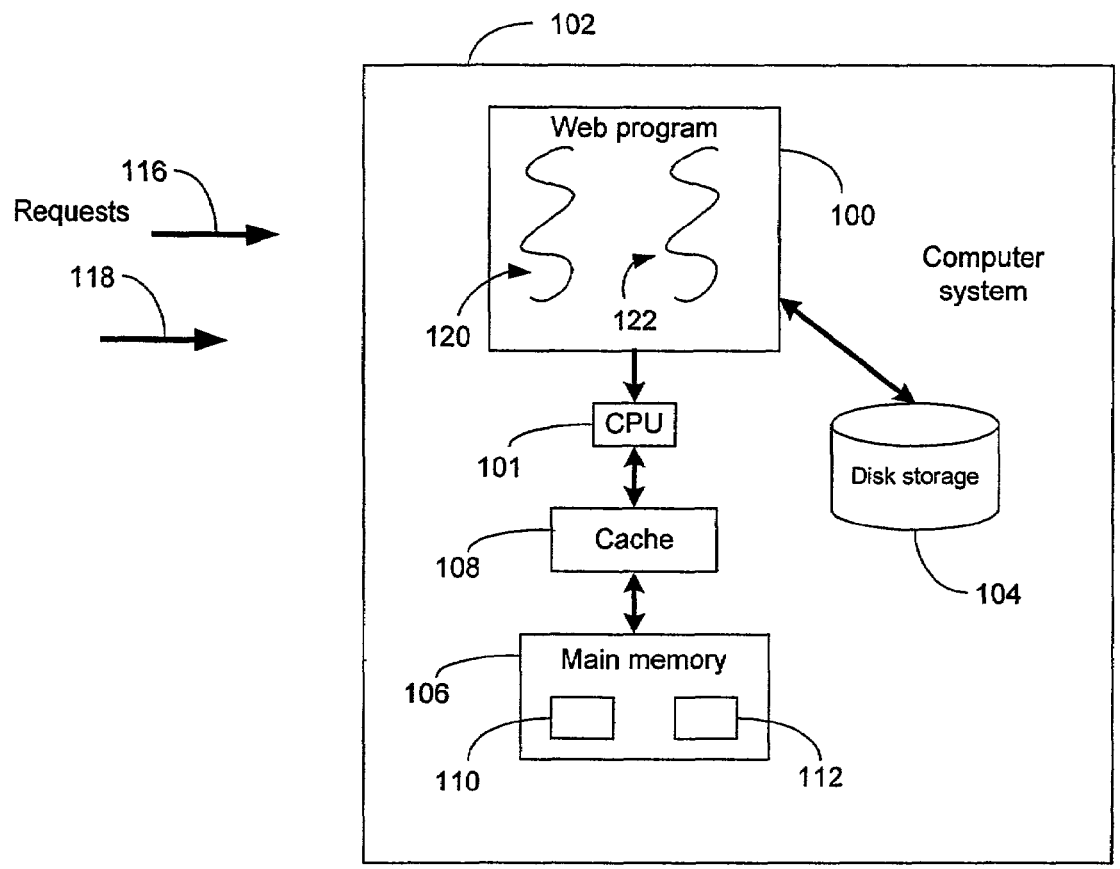
FIG. 2 is an example of a conventional, thread based program.

An example of the inefficiency and cache-destructive nature of thread-based programs is illustrated in FIG. 2, in which a conventional web server program is depicted The web server program, generally labeled 100, executes on a computer system 102 having a disk storage 104, a main memory 106, and an initially empty cache 108. It is assumed that the web server program 100 services Hypertext Transfer Protocol (HTTP) "Get" requests by performing two operations: parsing the request to determine the filename of the requested file and retrieving the file from the disk storage 104. As is conventional, execution of each of the two operations requires computer readable data and computer executable instructions (collectively referred to as "data"). In this example, it is assumed that the data for performing the parsing and retrieving operations are located in main memory and are labeled data blocks 110 and 112 respectively.

In the illustrated example, the web server program 100 receives two independent Hypertext Transfer Protocol (HTTP) "Get" requests 116 and 118. In response, the web server program 100 creates threads 120 and 122 to handle the respective requests. Since the request 116 arrived first, the web server program 100 runs the thread 120 first. To perform the parsing operation on the request 116, the thread 120 reads the data block 110 from the main memory 106 into the cache 108, and executes the appropriate set instructions. Once the request 116 is parsed, the thread 120 determines that it needs to retrieve the requested page from the disk storage 104. To perform the retrieving operation, the thread 120 reads the data block 112 from the main memory 106 into the cache 108, thereby overwriting the data block 110, and executes the appropriate set of instructions.

As the file requested by the thread 120 is being retrieved from the disk storage 104, the thread 120 is suspended. In the meantime, the web server program 100 executes the thread 122. Like the thread 120, the thread 122 reads 110 from the main memory 106 into the cache 108, thereby overwriting the data block 112, and executes the appropriate parsing instructions. The thread 122 then reads the data block 110 from the main memory 106 into the cache 108, overwriting the data block 110, and executes the appropriate file retrieving instructions.

It can be seen from the foregoing example that, although both of the threads 120 and 122 independently attempted to maintain cache locality with respect to themselves, they managed to negate cache locality with respect to the overall service required of the web server program 100—namely, that of executing two parsing operations and executing two reads from disk. Also, since the threads were running independently, they were very likely to be competing for simultaneous access to system resources, resulting in the placement of locks and the creation of bottlenecks.

Figure 3:
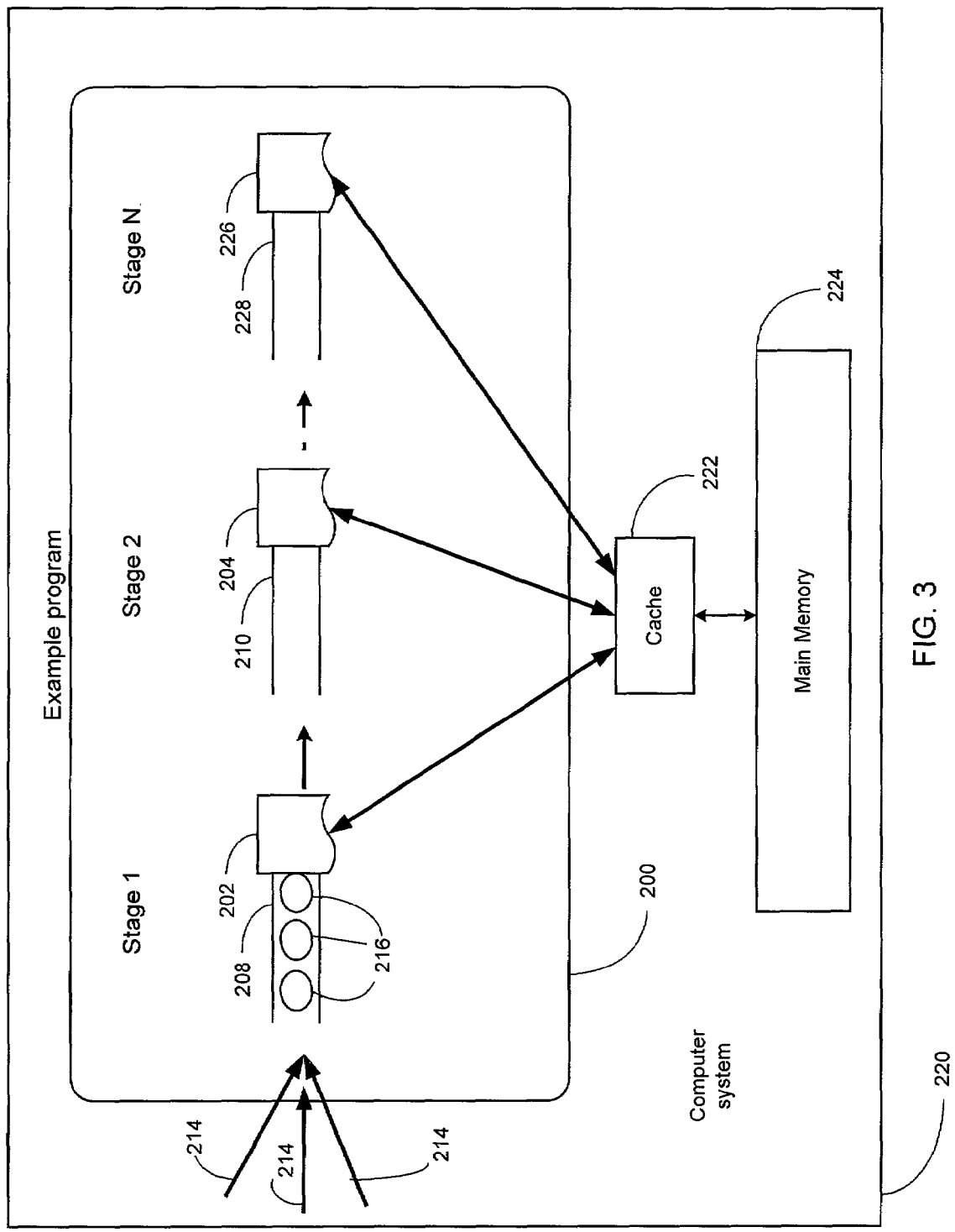
FIGS. 3–5 are an example of a web server configured according to an embodiment of the invention.
Figure 4:
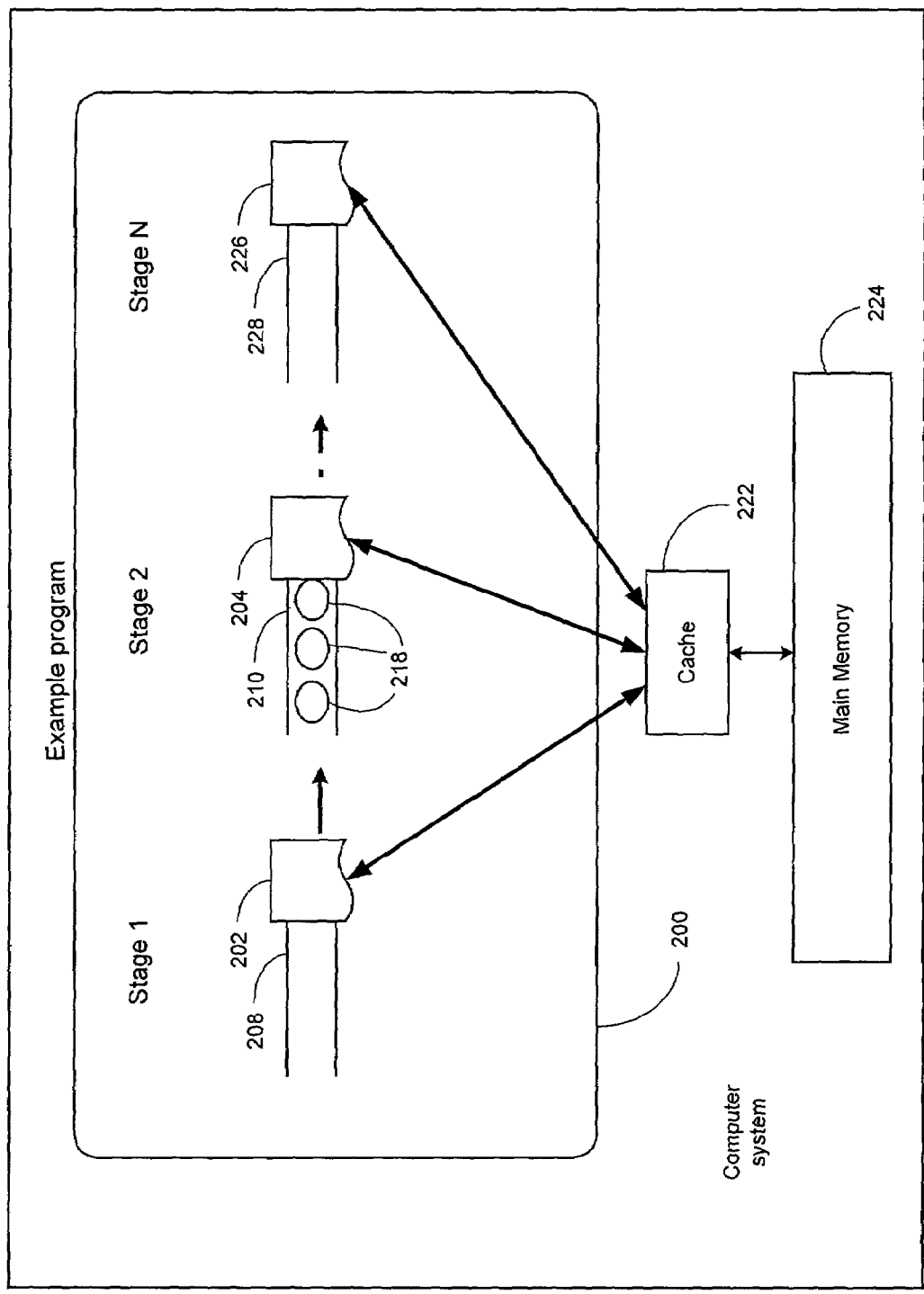
Figure 5:
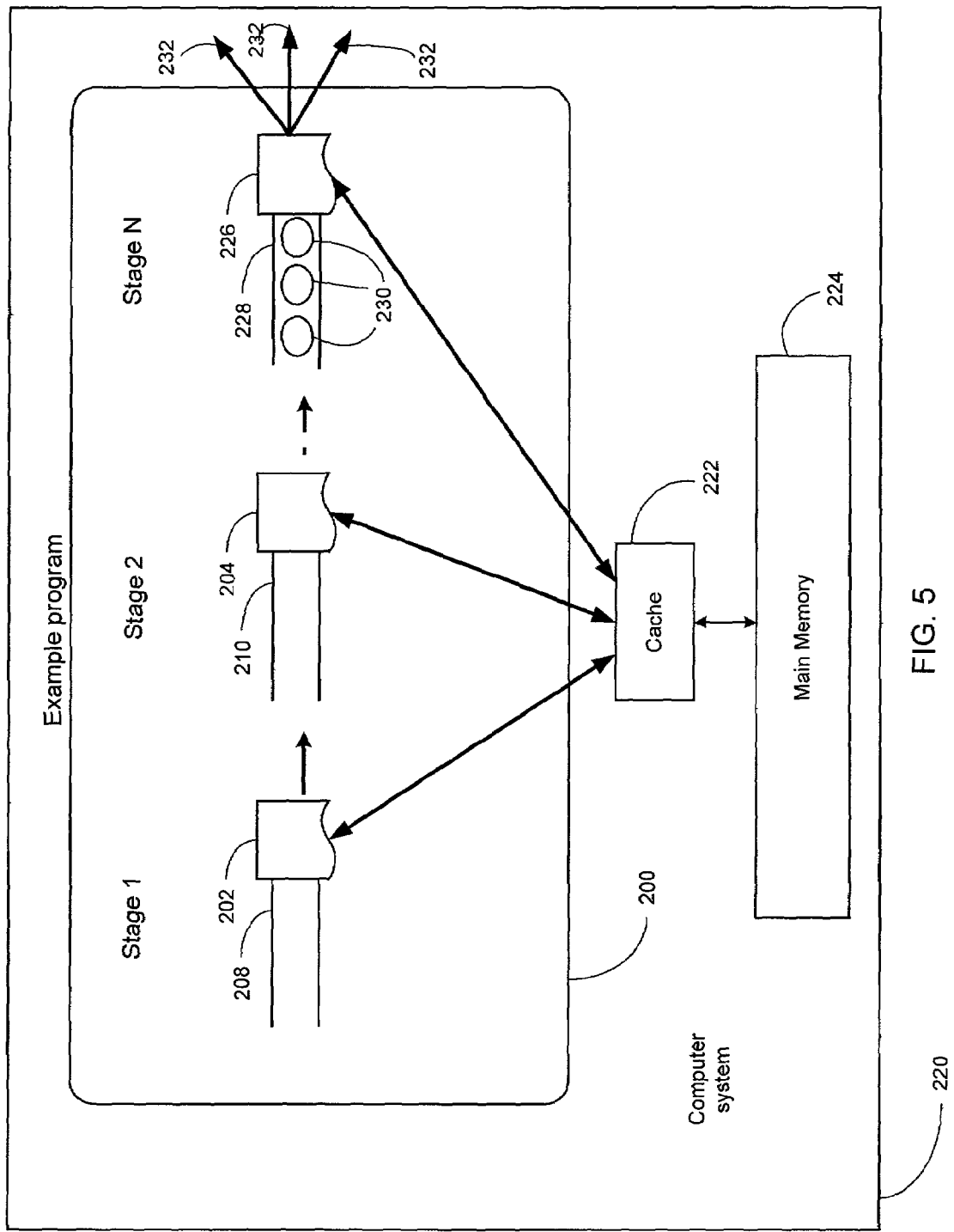

By way of contrast, FIGS. 3–5 show an example of how the same set of web server requests are processed according to an embodiment of the invention. It is understood, however, that the invention is not limited to web servers. An example program 200 executes on a computer system 220 having a cache 222 and a main memory 224. The program 200 performs the overall task of providing a web page in response to client requests, and is divided into at least two stages. The first two stages are labeled stage 1 and stage 2, and final stage is labeled stage N. Any number of stages are possible, however. Each of the stages has a stage object, labeled 202, 204 and 226 respectively. Each stage object has a respective holding area 208, 210 and 228 for holding program data that is usable to perform its sub-task. As requests—labeled 214—for services are received by the program 200, program data for performing the sub-task of stage 1 in accordance with the requests 214 is placed into the holding area 208 of the stage object 202, preferably in the form of work packets 216 (FIG. 3). A processor performs the sub-task of the stage object 202 (for example, parsing the requests) on each of the work packets 216 until the holding area 208 is empty.

A second set of work packets 218 (FIG. 4) is then placed into the holding area 210 of the stage object 202. The work packets 218 may include data representing the results of the sub-task performed at stage 1. A processor of the computer system 200 performs a second sub-task (e.g. reading web pages from a disk) on each of the work packets. Then, another set of work packets is placed in the holding area of the next stage object (not shown). A processor repeatedly performs the sub-task of that stage on the packets until the holding area is empty, and so on. This process continues until a processor at stage N performs its sub-task on the final set of packets, labeled 230, which are being held in the holding area 228 of the stage object 226 (FIG. 5). A set of results 232 is then sent back to the requestors. At this point, unless errors have occurred, the overall task of the program 200 will have been performed on each of the requests 214.

Since batch processing at each stage of the above-described example involves repeated execution of the same sub-task, the data and instructions needed to perform the sub-task of a stage are more likely to be in the cache 222 than in a conventional thread-based program. Furthermore, since there aren't independent threads of control in the example program, the number of locks created is smaller than in a thread-based program.

Figure 6:
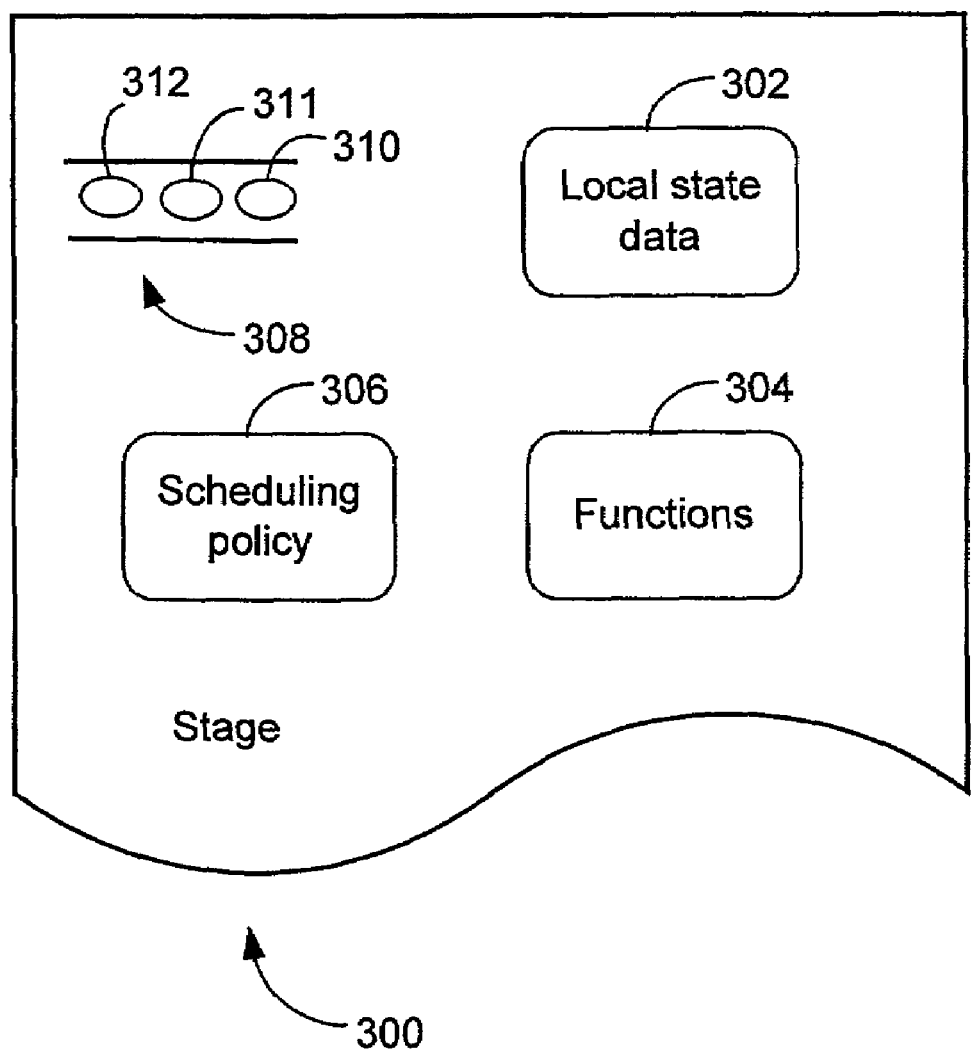
FIG. 6 is an example of a stage object that may be used in an embodiment of the invention.

A stage object may be implemented in a variety of ways. Referring to FIG. 6, an example of how a stage object may by implemented in an embodiment of the invention will be described. The stage object, generally labeled 300, is a data structure that includes local state data 302, a set of functions 304, a scheduling policy 306, and a holding area 308. The holding area 308 holds work packets 310, 311 and 312, which are another type of data structure that will be discussed later. The holding area may be implemented as, for example, a queue or a stack. Although only one holding area is shown, each stage may have a number of holding areas. For example, a stage may have a holding area for each processor in the computer system. The stage object 300 may be one of several stage objects in a program, and is associated with a sub-task of that program, which will be referred to as sub-task 300a.

To perform sub-task 300a of the program, a processor determines whether there are any work packets in the holding area 308, and, if there are, performs the sub-task 300a using, data and/or functions in work packet 310, and removes the work packet 310 from the holding area 308. The processor then repeats this procedure for work packets 311 and 312. While performing sub-task 300a, the processor maintains the local state data 302 as necessary. The local state data may include the most recently executed lines of code as well as the most recently used operands. It is beneficial to the efficiency of the processor if the amount of data in the processor references from the data state 302 does not exceed the size of the processor's local cache. Thus, in performing sub-task 300a for a large of iterations, (e.g. 300 work packets) the processor advantageously maximizes the use of the cache and minimizes the use of main memory, since the repeated use of the functions and operands needed to perform the sub-task 300a make it more likely that they will be in cache when needed by the processor.

While there are many possible implementations of a "work packet," one implementation will now be described. The way in which this implementation of a work packet interacts with a stage object will also be described. According to an embodiment of the invention, a work packet, such as one of the work packets shown in FIG. 6, is a data structure containing the functions and data necessary for a processor to perform the sub-task of a stage. The functions and data may be contained directly within work packet data structure or indirectly in the form of pointers to the functions and data. In another embodiment, a work packet may contain only data, with the functions needed to perform the sub-task being located in the stage object. There may be a different type of work packet for each type of stage. A processor may execute a work packet from the queue of a stage object asynchronously. To "execute" a work packet in this context means that a processor calls the functions contained in the work packet and performs operations on data contained in the work packet for the purpose of performing the sub-task associated with the stage.

When a work packet is executed at a stage in a program, any number of "child" work packets may be created as a result of the execution and be placed in the holding area of any instance of a stage object. The child work packets are then executed independently of the "parent" work packet. When the parent work packet finishes executing, it can wait for some or all of its children to finish, retrieve the results of their computation, and pass these values along to another work packet, referred to as a "continuation," for further processing.

Figure 7A:
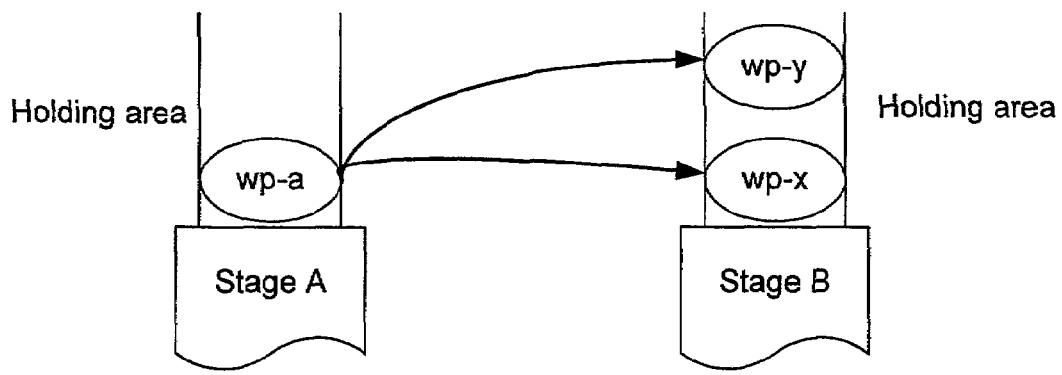
FIGS. 7a–7c illustrate how child operations may be invoked in an embodiment of the invention.
Figure 7B:
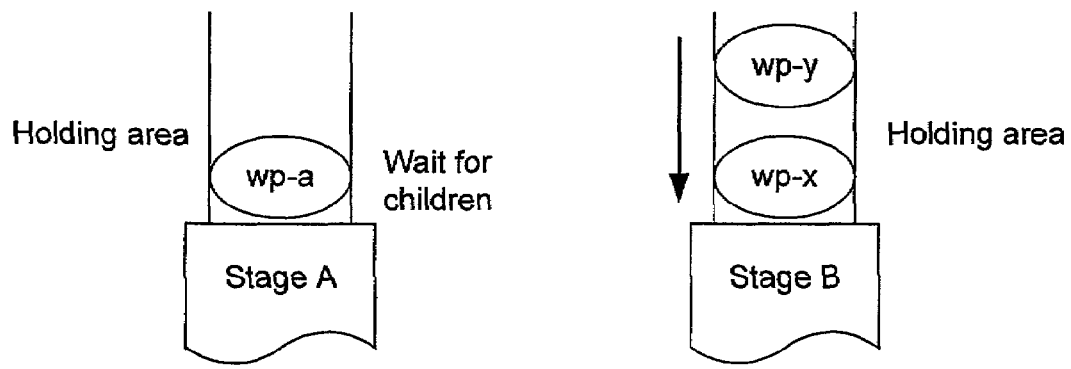
Figure 7C:
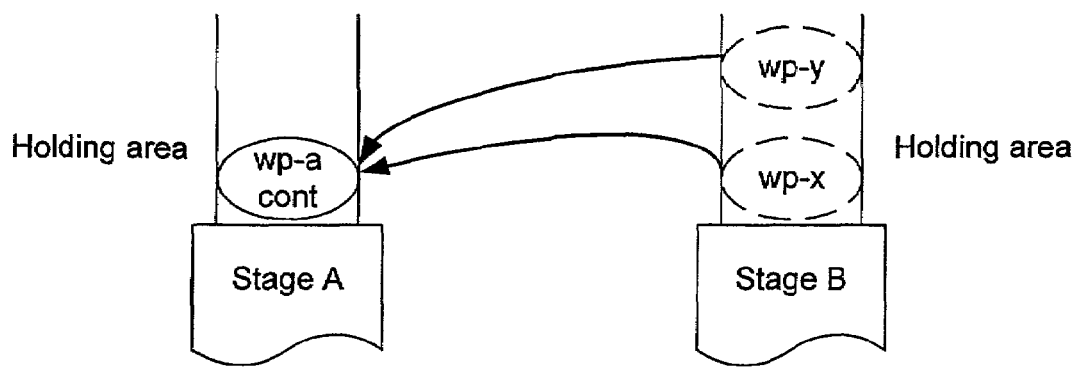

Child and parent work packets may interact in a variety of ways. Referring to FIGS. 7a–7c, an example of how child and parent work packets interact according to an embodiment of the invention will now be described. As shown in FIG. 7a, stage A has one work packet, wp-a, in its holding area. When wp-a is executed, it creates child work packets, wp-x and wp-y, and puts them in the holding area of stage B. The work packet wp-a then waits for its child work packets to be executed at stage B (FIG. 7b). As shown in FIG. 7c, the child work packets, wp-x and wp-y, are finished being executed As their execution completes, wp-x creates a continuation work packet, wp-a cont, and puts it in the holding area of stage A for execution.

In an embodiment of the invention, each "family" of work packets can be provided with a value, referred to herein as a "session key." If work packets need to be cancelled, the session key allows a program to do so on a limited basis. For example, the program may, using the session key, designate a family of work packets for cancellation, as opposed to canceling all outstanding work packets. In a more specific example, the family of work packets shown in FIGS. 7a–7c may have a session key of 2D5A. To cancel work packets wp-a, wp-x, and wp-y, a single command, such as "cancel 2D5A" may be sufficient.

Figure 8:
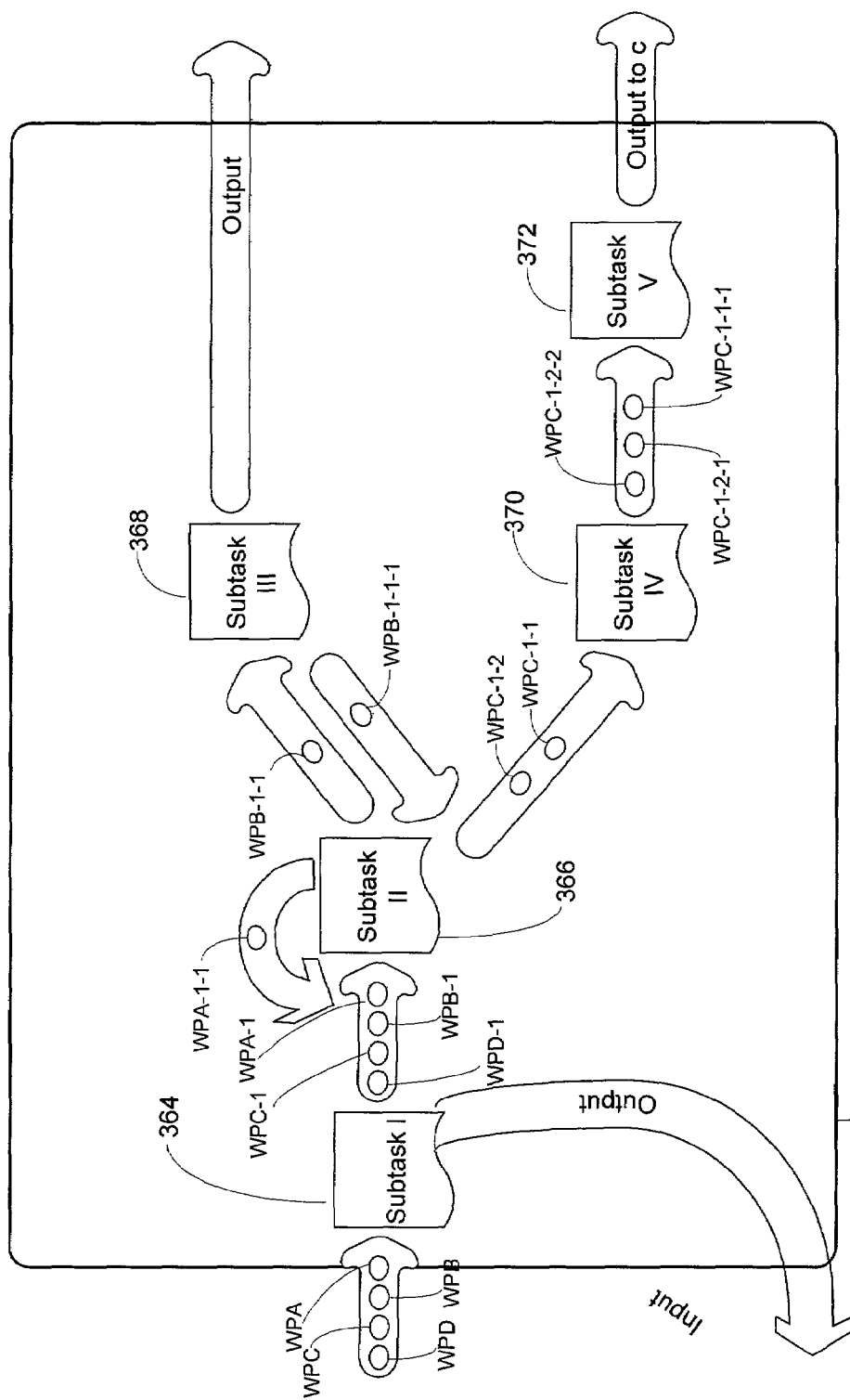
FIG. 8 illustrates how a staged program may operate in an embodiment of the invention.

According to an aspect of the invention, a program may be organized into any number of stages. The overall task carried out by the program may involve the execution of sub-tasks at several stages. Thus, the flow of work can move from stage to stage in any appropriate order. An example of how work can move through multiple stages will now be described. Referring to FIG. 8, a program 374 runs on a computer system and organized into stage objects 364, 366, 368, 370, and 372. The sub-tasks associated with the respective stages will be referred to as sub-tasks I, II, III, IV and V. Four client programs labeled program a, program b, program c, and program d each make a request to the program 374 for the performance of a task. No assumption is made as to how many processors are on the computer system, as the sub-tasks of each stage may be performed by two or more processors at a time, or by a single processor, depending upon the scheduling policy, if any, that is used. Likewise, a processor may switch from performing one stage's sub-task to performing another stage's sub-tasks.

These requests are initially manifested at stage 364 in the form of work packets WPA, WPB, WPC and WPD. The computer system performs an iteration of sub-task I at stage 364 using work packet WPA, an iteration of sub-task I using work packet WPB, an iteration of sub-task I using work packet WPC, and an iteration of sub-task I using work packet WPD. During the course of performing sub-task I with WPA, the computer system creates a child work packet WPA-1 and sends it to stage object 366. Similarly, child work packets WPB-1 and WPC-1 are created during the course of performing sub-task I on WPB and WPC and sent to stage object 366. However, when the computer system performs sub-task I on work packet WPD, no child work packets are created, but rather the computer system returns a result to the client program d.

Referring again to FIG. 8, the computer system performs sub-task II at stage object 366 on work packets WPA-1 and WPB-1, during which child work packet WPA-1-1 is created and sent back to stage object 366, and WPB-1-1 is created and sent to stage object 368. While performing sub-task II on WPC-1, however, the computer system creates two child work packets—WPC-1-1 and WPC-1-2, which are sent to stage object 370. At stage object 368, the computer system performs sub-task III using work packet WPB-1-1, resulting in an output that is returned to the client program b. At stage object 370, the computer system performs sub-task IV using work packet WPC-1-1, resulting in the creation of a child work packet WPC-1-1-1. Performing sub-task IV using work packet WPC-1-2 results in the creation of two child work packets, WPC-1-2-1 and WPC-1-2-2, which are sent to stage object 372. The computer system performs sub-task V at stage object 372 using work packets WPC-1-1-1, WPC-1-2-1, and WPC-1-2-2, resulting in outputs that are sent to the client program c.

Figure 9:
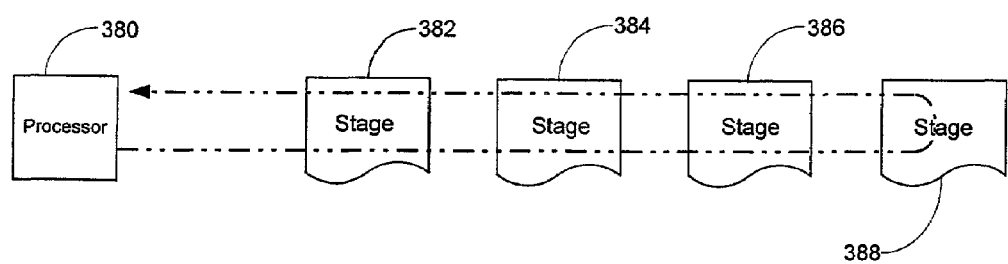
FIG. 9 shows an example of scheduling that may be used in an embodiment of the invention.

In the previous example, the various sub-tasks were described as being performed by a "computer system." Within the computer system, however, there may be multiple processors. In one embodiment of the invention, each stage may assign tasks to the processors of the computer system. In another embodiment of the invention, each stage acts as a distribution point from which the processor or processors of a computer system pick up their work. A processor may choose the stage from which it picks up work in a variety of ways. Referring to FIG. 9, for example, a processor 380 is shown moving among stages 382, 384, 386 and 388 in a "wave-front" manner. Specifically, the processor 380 performs several iterations of the sub-task of stage 382, then does likewise for the stage 384, 386 and 388 before moving back to 386, 384 and 382 in that order. A wave-front algorithm helps maintain cache locality in an embodiment of the invention, since it is likely that two stages that come close together in sequence require similar data. For example, stage 384 might use results produced at stage 382. Therefore, having the processor 380 do the work of stage 384 immediately after stage 382 makes it less likely that there will be a cache miss at stage 384.

In an embodiment of the invention, a scheduling policy may be implemented to coordinate the activities of multiple processors when they perform the work of the various stages in a program. Scheduling policies help reduce the need for synchronization mechanisms such as locks, mutexes and critical sections. A scheduling policy may, for example, dictate how many processors are permitted to perform the work of a stage at any given time. There are many types of scheduling policies possible. Furthermore, scheduling policies may be implemented on a stage by stage basis or for an entire program.

Figure 10:
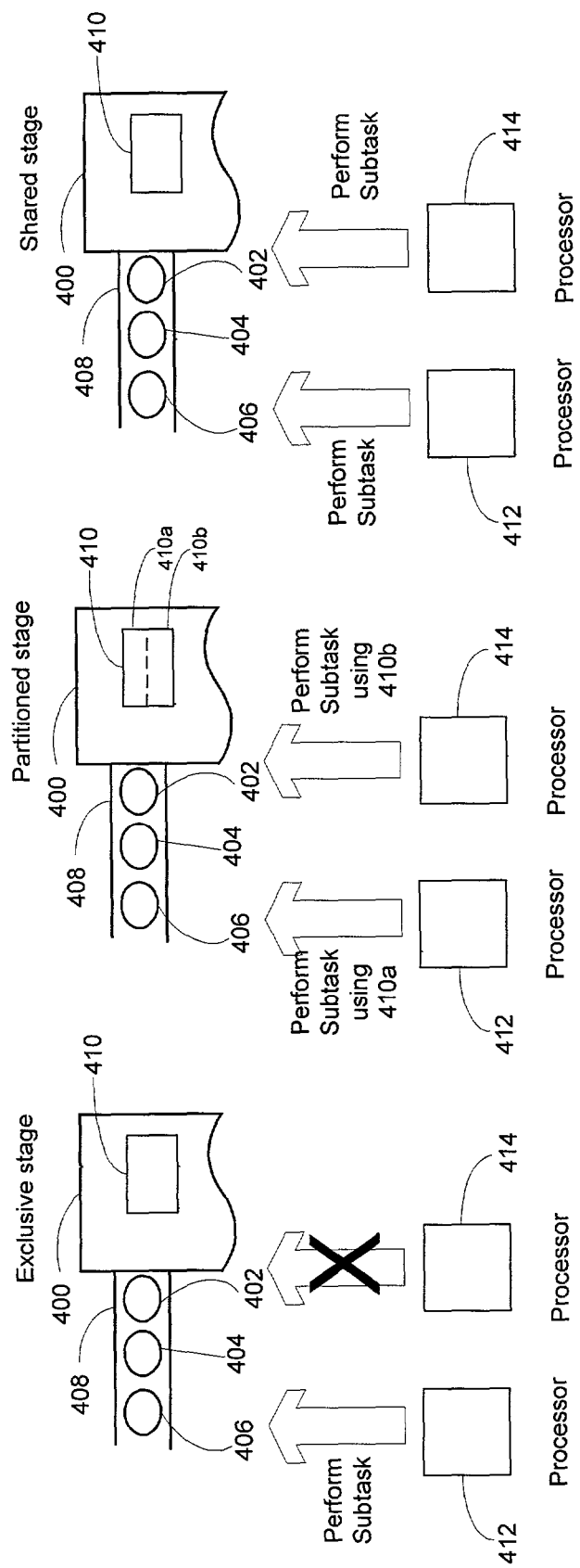
FIG. 10 shows more examples of scheduling that may be used in an embodiment of the invention.

Examples of three possible scheduling policies will now be described with reference to FIG. 10. In each example, a stage object 400 of a computer program is assumed to have three work packets 402, 404 and 406 in its queue 408. Stage object 400 is also assumed to have a local data state 410. Three iterations of a sub-task of the computer program are to be performed at stage object 400 using data and/or functions contained in the three work packets. It is also assumed that two processors 412 and 414 are currently available to perform work. In the first policy type, referred to as "Exclusive," the work packets in the queue of stage object 400 may only be processed by one processor at a time. Thus, if processor 412 is currently performing a sub-task of the program using the work packets in the queue 408, processor 414 will not be permitted to help out, even though processor 414 is idle. This policy helps insure the integrity of the local data state 410 and reduce the chance that two or more processors will be required to update one another's cache.

In the second policy type, referred to as "Partitioned," multiple processors share the workload of a stage in some logical way. For example, if the sub-task associated with stage object 400 is to retrieve a page from memory, then processor 412 might be responsible for retrieving pages starting at addresses 0x80000000 and above, while processor 414 might be responsible for retrieving pages starting at addresses 0x7FFFFFFF and below. While the processors might switch roles in terms of the page ranges for which they are responsible, it is preferred that the Partitioned scheduling policy insures that no two processors are handling the same partition—range of page addresses, in this case—at the same time. Each work packet may contain a value to identify which section of the local data is to be used for processing it. This value will be referred to herein as a "partition key." To help detect which work packets "belong" to which processor, each of the work packets 402, 404 and 406 may, for example, contain a partition key for identifying which of the two address ranges are to be retrieved so that the appropriate processor can be called upon to do the work. This scheduling policy may advantageously be used when the local data state 410 itself is partitioned into different sections for each processor. For example, the processor 412 might only need to access section 410a of the data state to perform its iterations of the sub-task, while the processor 414 might only need to access section 410b of the data state to perform its iterations of the sub-task.

Finally, the third policy type is referred to as "Shared," in which any available processor may come along and start performing the sub-task associated with the stage without restriction, provided that there are work packets in the queue 408 that need to be processed. This scheduling policy is advantageous when the nature of the sub-task associated with the stage is such that there is no concern about coordinating the access of multiple processors to the local data state 410 (e.g. when the local data state 410 is read-only). Thus, processor 412 may perform two iterations of the sub-task using work packets 402 and 404, while processor 414 performs the remaining iteration of the sub-task using work packet 406.

Figure 11:
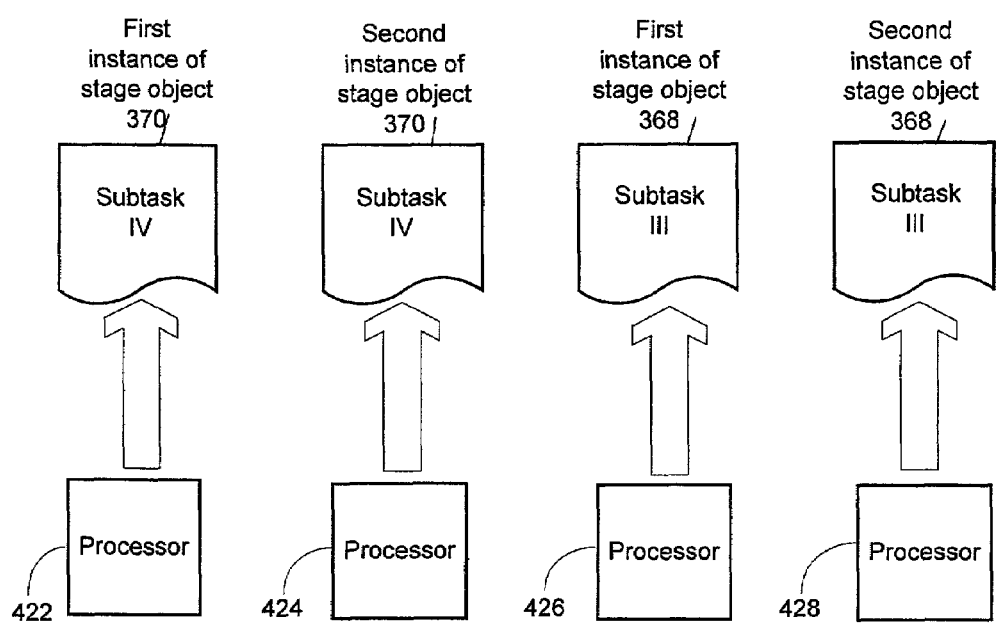
FIG. 11 illustrates how a stage object may be instantiated on multiple processors in an embodiment of the invention.

According to yet another aspect of the invention, each stage object of a computer program may be instantiated on multiple processors. Referring to FIG. 11, for example, a first instance of stage object 370 (from FIG. 8) exists on a processor 422, while a second instance of stage object 370 exists on a processor 424. Stage object 368 (again from FIG. 8), on the other hand, is instantiated on processors 426 and 428. Thus, processors 426 and 428 are both performing sub-task III, while processors 422 and 424 are performing sub-task IV. In an embodiment of the invention, the number of instances of a stage object that are permitted to run on different processors depend on the scheduling policy that applies to the stage object. For example, stage object 368 might be operating under a shared or a partitioned policy. An exclusive policy, however, would not permit stage object 368 to run on two processors at the same time as shown in FIG. 11.

To help further maximize the use of local cache in a multiprocessor system in accordance with an embodiment of the invention, a stage may have both a stack and a queue for holding work packets. The stack, which is a last-in, first-out (LIFO) data structure, is used for holding work packets that were instantiated by the processor on which the stage object is instantiated, while the queue, which is a first-in, first-out (FIFO) data structure, is used for holding work packets that arrive from other processors. When a processor performs the work of the stage, it first looks to the stack to see whether there are any pending work packets. If there are no work packets pending in the stack, it then checks the queue.

Figure 12:
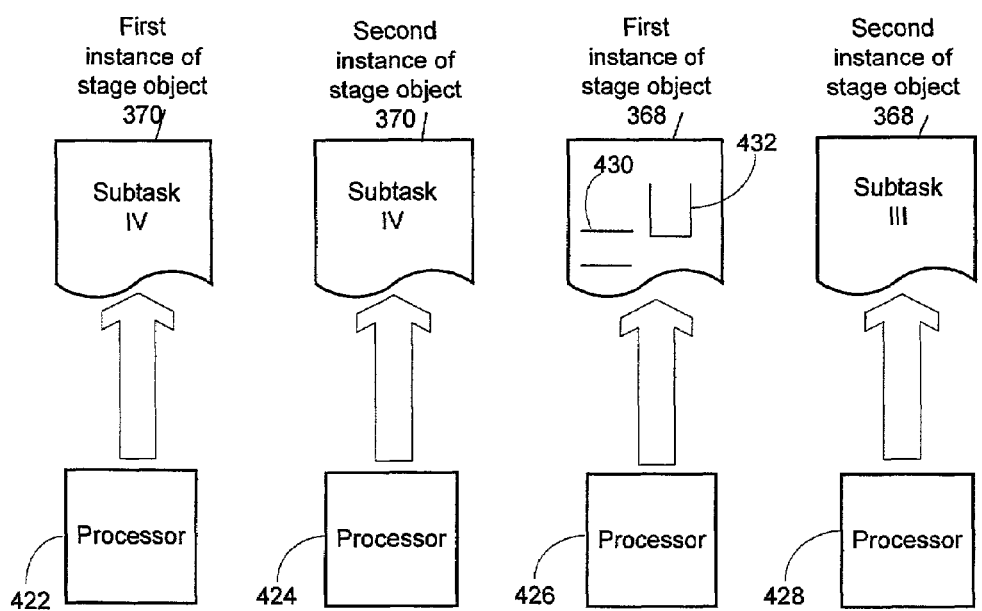
FIG. 12 illustrates the use of a stack and a queue on a stage object in an embodiment of the invention.

Referring to FIG. 12, for example, the second instance of stage object 368 from FIG. 11 is shown as having both a queue and a stack. Work packets arriving from the first instance of the stage object 368 as well as those from stage objects 370 and 372 are placed in the queue, since they originated from remote processors. Work packets originating from the second instance of stage object 368 are placed in the queue, since they originated from the local processor and are more likely to be in the local cache.

Figure 13:
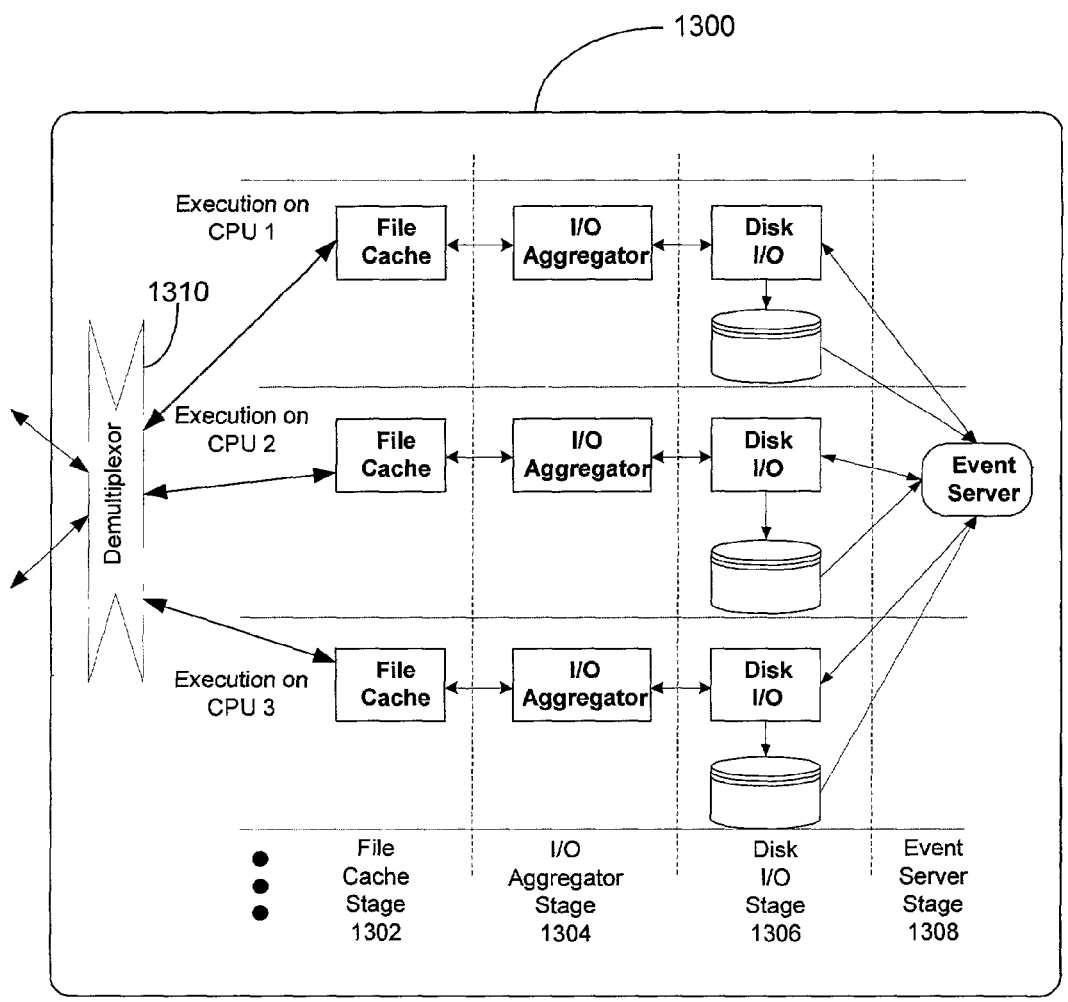
FIG. 13 illustrates a file cache program configured according to an embodiment of the invention; and, FIG. 14 shows examples of C++ code that may be used in an embodiment of the invention.

Referring to FIG. 13, an example of how a file cache program may be implemented according to an embodiment of the invention is shown. A file cache is an important component of many programs, including web servers, that stores recently accessed disk blocks in memory. It maps file-disk block identifiers to cached copies of disk blocks. Its primary data structure is a hash table, which, in a conventional thread-based program is usually protected by mutexes. In this example, the file cache program, generally labeled 1300, is assumed to be running on a computer system having three CPUs—CPU 1, CPU 2 and CPU 3. The file cache program includes a File Cache stage 1302, an I/O Aggregator stage 1304, a Disk I/O stage 1306, and an Event Server stage 1308. The first three stages, 1302, 1304 and 1306, are instantiated on the CPU 1, 2 and 3 according to a "partitioned" scheduling policy. The Event Server stage 1308, on the other hand, is instantiated on the CPU 2 according to an "exclusive" policy. The cache on the computer system is logically partitioned across the stages 1302–1306, so that each CPU manages the cache for a unique subset of the files. A demultiplexor module 1310 receives requests from clients of the file cache program 1300 and directs those requests to the proper partition—i.e. the proper CPU—based on a data taken from a field of each request. For example, the demultiplexor module 1310 may direct a request based on a hash of the file number of the requested file. If the file is large, its disk blocks can be striped across the CPUs. Clients of the program 1300 do not see the mapping, as a wrapper function hides the translation. Each respective stage maintains a collection of hash tables, one per processors, which map file identifiers to memory-resident disk blocks. If a block is in the cache, the stage 1302 responds with a pointer to the data. Since each table is referenced by operations running on a single processor, the hashing code need not be synchronized and data does not migrate between processors. Moreover, groups of requests are scheduled together to enhance the locality of reference to this table.

If a disk block is not cached in memory, the program 1300 puts a work packet on the I/O Aggregator stage 1304, which merges requests for adjacent disk blocks, to improve system efficiency. By delaying execution, the I/O Aggregator stage provides a natural framework to accumulate and combine individual requests. After being processed by the I/O Aggregator stage 1304, requests move to the Disk I/O stage 1306. The Disk I/O stage 1306 reads and writes disk blocks. It issues asynchronous system calls to perform these operations and, for each, invokes a work packet in the Event Server stage 1308 describing the pending I/O. To accommodate the operating system's asynchronous notification mechanism, the CPU 2, in performing the sub-task of the Event Server stage 1308, waits on an I/O Completion Port that the computer system uses to signal completion of asynchronous I/O. Upon a completion, the Event Server stage 1308 returns information from this port to the Disk I/O stage 1306 that initiated the operation. The Disk I/O stage 1306 in turn passes the disk block to the I/O Aggregator stage 1304, which in turn passes this information to the File Cache stage 1302, which records the address of the disk block in its hash table and passes the address to the client that made the request. To ensure that the disks stay busy, the Disk I/O stage is scheduled under a policy that guarantees that it runs every 10 milliseconds.

The various data structures referred to herein may be implemented in a variety of ways and in any suitable programming language. To help illustrate the invention, an implementation of a stage written in C++ will now be described. The template base class for this implementation of a stage is labeled "STAGE," and has the following constructor:

STAGE::STAGE(const char *Name, STAGE_TYPE Type,
   bool BalanceLoad=false, int CacheSize=0, int Critical-
   Size=0, int CriticalTimer=DefaultTimer, bool
   MaintainOrder=false, int
   MaxBatchSize=StageBatchSize)

The first argument—Name—provides the name of the stage object. The next argument—BalanceLoad—is a Boolean value used by the stage object to enforce its scheduling policy. If it is set to "true," then the stage object forces any processor performing the sub-task of the stage to load balance with the rest of the stages. For example, if a processor has completed its most recent batch of work packets and is looking for work at stage A, and the stage object at stage A has its BalanceLoad parameter set to "true," then the processor will automatically look to stage objects at other stages to see if any have a greater number of pending work packets than stage A. If another stage has more pending work packets than stage A, then the processor will start processing the work packets of that stage—i.e. performing the sub-task of stage A using the work packets at the stage object of stage A. If not, then the processor continues to process work packets at stage A.

The parameter CacheSize allows a programmer to specify the size of the cache memory that will be allocated to the stage. The next two parameters—CriticalSize and CriticalTimer—are used to modify the order in which the stages of a program are executed. The CriticalSize parameter sets the maximum number of work packets that are allowed to accumulate at a stage before the stage receives immediate attention from a processor. CriticalTimer sets the maximum interval of time that is permitted to pass before a processor is summoned to do the work of the stage. Referring to FIG. 9, for example, the processor 380 performs the work of stages 382, 384, 386 and 388 using a wavefront algorithm. Assuming that the processor 380 is currently doing the work (i.e. performing the sub-task of) stage 388, then the next stage to receive service from that processor would normally be stage 386. However, if stage 382 had a CriticalSize parameter specified and the number of pending work packets at stage 382 exceeded the CriticalSize, then the processor 380 would proceed directly to stage 382 as soon as it finished executing the current work packet of stage 388. Thus, the processor would skip stages 386 and 384 in order to service stage 382. The same result would also occur if stage 382 had a CriticalTimer parameter and the specified interval (e.g. 200 ms) had been exceeded. CriticalSize and CriticalTimer may advantageously be used on a stage in a user-level program for which there is a lot of data being sent to the operating system. Such a use would help ensure that the operating system did not remain idle.

The MaintainOrder flag, when true, prevents the stage from using a stack as a holding area for work packets. Thus, all incoming work packets are placed in a queue, regardless of which processor sent them. They are then processed in the order in which they were received. Finally, the MaxBatch- Size parameter indicates how many work packets a processor is to process before looking for another stage. For stages in which the sub-task to be performed is very time consuming this parameter may, for example, help prevent one stage from monopolizing processor resources.

According to an embodiment of the invention, the code within a work packet runs on a processor in a normal, sequential manner. It can invoke both conventional —synchronous—procedure calls and asynchronous work packets. However, once started, a work packet runs until it finishes, upon which it relinquishes the processor. Because work packets terminate, a stage need not prepare to save processor state and stack. An executing work packet that needs to suspend and wait for an event—such as I/O, synchronization, or another work packet's completion—can specify another work packet, referred to as a continuation, to be invoked when the event occurs. Both the work packet and its continuation share a per-invocation state (a closure) that can be used to store and pass values.

There are many possible ways to implement a work packet in accordance with the invention. One implementation will now be described. The base class for defining a work packet in this implementation is a closure. A closure is a combination of code and data. When a work packet is first invoked on a stage, the work packet's invoker creates and initializes a closure that passes parameters of the work packet to the stage. To execute the work packet, the stage runs the closure method specified by the invocation. The work packet can invoke child work packets on other stages and wait for them to produce results. The work packet can also provide the stage with a work packet—referred to as a "continuation"—to run when the child work packets finish. A continuation is defined by another method in the original closure. The closure also provides space to pass state information to the continuation and space where the children can return results. The process of creating child work packets and continuation work packets can be repeated multiple times, with each continuation taking on the role of the original work packet. In practice, a stage treats may treat an original work packet and a continuation work packet the same way.

Referring to FIG. 14, a more specific example of code that may be used to implement work packet and stages is shown and will now be described. The work packet code is called MY_PACKET and the initial operation is StartChildren, which spawns its children by creating new work packets that execute the operation NewChild. After invoking its children, the first work packet waits for them to finish and provides a continuation, WakeAfterSleep, which verifies the children produced the correct result and terminates the original operation.

The creation and invocation of a work packet is provided by an overloaded new operator. In C++, the new operator can take a set of parameters distinct from the parameters passed to an object's constructor. The C++ implementation shown in FIG. 14 uses the new operator's parameters to pass information to the stage. For example, in FIG. 14, StartChildren creates closures for child work packets using the following statement:

new(NewChild, &MyStage, NoPartitionKey, NoSessionKey, Children[Count]) MY_PACKET(Count)

The first parameter list specifies the member function that is invoked (NewChild), the stage that will execute the operation (MyStage), that there is no partition or session key, and a location in which the child should return its result. The second parameter list, to MY_PACKET's constructor, passes Count as a parameter to the invocation.

The closure data structure that helps define the work packet is as follows:

VOID *CLOSURE::new(unsigned int Size, FUNCTION Function, STAGE *TargetStage, int PartitionKey=NoPartitionKey, int SessionKey=NoSessionKey, VALUE *ResultLoc=NULL)

Size is the size of the closure. Function is a method in the closure that is invoked to execute the work packet. The method has no arguments and is of the result type ACTION. Its parameters are passed in an indirect manner. They originate as arguments to the closure's constructor when the closure is instantiated—and the work packet is invoked. The constructor can store their values in the closure. The method can reference the values as class instance variables in the closure object.

TargetStage is the stage that will run the operation. PartitionKey is the value used to distribute work among processors in a partitioned stage. In other implementations of stages, PartitionKey may specify which processor should execute the operation. SessionKey names a group of computations, across one or more stages, which can be controlled, i.e. terminated, collectively. Finally, ResultLoc is the location where the operation should return its result.

When a work packet is executing, it can invoke other work packets. However, the program may not pass the other work packets to their stages immediately, because it may not have full information about the rendezvous between parent and child. In particular, the parent's stage does not know the total number of children created or the parent's continuation, if any. When a work packet finishes execution, this information is known, so stages defer passing work packets to other stages until an executing work packet finishes.

When an operation, either the original or a continuation, finishes execution, it informs its stage of its state by calling one of the following functions:

ACTION CLOSURE::Complete(VALUE *Value=NULL)
ACTION CLOSURE::DispatchChildren(FUNCTION Continuation=NoFunctionCall)
ACTION CLOSURE::WaitForChildren(FUNCTION Continuation=NoFunctionCall)
ACTION CLOSURE::WaitForEvent(FUNCTION Continuation=NoFunctionCall)

The Complete function specifies that a work packet is finished and provides a value to return. This function also indicates that the work packet's children need not return results, as no continuation will see them, and that the CLOSURE data structure can be deallocated. DispatchChildren starts the children, but does not way for them, as it immediately invokes the specified continuation. WaitForChildren starts the children and waits for them to complete before invoking the specified continuation. WaitForEvent starts the children and suspends the current operation. The continuation will be invoked when an event is raised on the operation's closure.

Deferring passing child work packets to their stages enables the controlling stage to optimize the rendezvous between parent and child. If the parent is not going to wait for its children, the children are marked as orphans, which means that they won't return a result and need not inform their parent when they finished. If the parent has only one child, it does not require synchronization and can directly re-enable the parent's continuation. If there are multiple children, they decrement a counting semaphore, initialized with the number of children, and the last one re-enables the parent's continuation.

It can thus be seen that a new and useful method and system for performing a task on a computer has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A method of performing a task on a computer system having a cache, wherein the task comprises a plurality of sub-tasks, the method comprising:
   (a) instantiating a plurality of stages, the plurality of stages comprising at least one stage for each of the plurality of sub-tasks, each stage comprising:
      a holding area; and
      a scheduling policy
   (b) receiving a plurality of requests for the task;
   (c) for each of the requests, storing in a work packet data for performing a subtask of the task;
   (d) storing each work packet in the holding area of the at least one stage for the sub-task;
   (e) executing the sub-task on each of the work packets in the holding area in accordance with the scheduling policy of the at least one stage for the sub-task while refraining from executing other sub-tasks of the task, thereby maintaining locality of instructions and data in the cache; and
   (f) repeating steps c, d and e for each sub-task of the task until all of the sub-tasks of the task are completed for each request.

2. The method of claim 1, wherein each sub-task has a type of work packet defined for it, wherein the work packet defined for the sub-task includes data and functions for performing the sub-task.

3. The method of claim 1, wherein the holding area is a queue.

4. The method of claim 1, wherein the holding area is a stack.

5. The method of claim 1, wherein at least one of the executed work packets is a parent work packet, the method further comprising:
   creating a child work packet for the parent work packet; and
   performing a sub-task of the plurality of subtasks on the child work packet.

6. The method of claim 5, wherein the sub-task performed on the child work packet is different from the sub-task performed on the parent work packet.

7. The method of claim 5, wherein the sub-task performed on the child work packet is the same as the sub-task performed on the parent work packet.

8. The method of claim 5, wherein the sub-task being performed on the parent work packet is halted until the sub-task being performed on the child work packet is completed.

9. The method of claim 5, wherein the sub-task being performed on the parent work packet is halted until a predefined event occurs.

10. The method of claim 1, wherein step (c) further comprises storing in the work packet a pointer to the data for performing the subtask.

11. A method of performing a task on a computer system having a cache, wherein the task comprises a plurality of sub-tasks, the method comprising:
    creating a plurality of instances of a stage for each sub-task, wherein each stage comprises:
       a holding area; and
       a scheduling policy;
    receiving a plurality of requests for the task;
    for each request, placing one or more work packets in the holding area, each work packet corresponding to an iteration of the sub-task required for the task and containing data for performing the sub-task; and
    performing the sub-task on each work packet in the holding area of the stage in accordance with the scheduling policy of the stage while refraining from executing other sub-tasks of the task, thereby maintaining data locality in the cache for the sub-task.

12. The method of claim 11, wherein the stage permits an instance of itself to be created on only a single processor in the computer system at a time.

13. The method of claim 11, wherein the stage includes a local data area, and wherein the stage regulates which processor is permitted to create an instance of it based on the part of the local data area required to be accessed.

14. The method of claim 11, wherein, for at least one of the stage instances created, there is at least one work packet that is a parent work packet, the method further comprising:
    creating a child work packet for the parent work packet;
    sending the child work packet to another stage instance; and;
    at the other stage instances, performing a sub-task of the plurality of sub-tasks on the child work packet.

15. The method of claim 11, wherein the holding area includes a stack and a queue, and the method further comprises: for each work packet received by at least one stage instance, putting the work packet in the stack if the work packet originated from the processor on which the instance of the stage is created, and putting the work packet in the queue if the work packet originated from another processor.

16. The method of claim 11, wherein each work packet contains at least one pointer to data for performing the sub-task.

17. A system for executing a procedure on a computer, wherein the procedure is divided into a plurality of sub-tasks, the system comprising:
    a computer-readable medium having stored thereon a plurality of work packets, each work packet including data usable to perform an iteration of a sub-task of the plurality of sub-tasks;
    a computer-readable medium having stored thereon a plurality of stages, there being at least one stage for each sub-task, each stage comprising:
       a holding area for holding a batch of the plurality of work packets; and
       a scheduling policy; and
    receiving a plurality of requests for the task;
    a processor for identifying a stage of the plurality of stages and for each request, performing an iteration of the stage's sub-task on each of the batch of work packets in accordance with the scheduling policy of the stage while refraining from executing other sub-tasks of the task, thereby maintaining locality of data in a cache of the processor.

18. The system of claim 17, wherein the processor is one of a plurality of processors and wherein at least one stage of the plurality is instantiated on at least two of the plurality of processors.

19. The system of claim 17, wherein the holding area of the identified stage includes a queue and a stack, wherein the queue is for holding work packets that originated from processors other than the one on which an instance of the identified stage is created, wherein the stack is for holding work packets that originated from the processor on which the instance of the stage is created.

20. The system of claim 17, wherein the identified stage has a local data area that is divided into sections, and wherein the processor determines whether to perform the sub-task of the stage based on the section of the local data area to which each work packet of the batch will require access.

21. The system of claim 17, wherein each work packet contains instructions necessary to perform the sub-task of the stage at which it is held.

22. The system of claim 17, wherein each work packet contains at least one pointer to instructions necessary to perform the sub-task of the stage at which it is held.

23. The system of claim 17, wherein each stage contains instructions necessary to perform its sub-task.

24. The system of claim 17, wherein the processor is one of a plurality of processors, wherein the holding area of each stage is one of a plurality of holding areas for the stage, and wherein each of the plurality of holding areas of a stage is associated with one of the plurality of processors.

25. The system of claim 17, wherein the holding area is a queue.

26. The system of claim 17, wherein the holding area is a priority queue.

27. The system of claim 17, wherein the holding area is a stack.

28. A computer-readable medium having stored thereon computer-executable instructions for a method of performing a task on a computer system having a cache, wherein the task comprises a plurality of sub-tasks, the method comprising:
   (a) instantiating a plurality of stages, the plurality of stages comprising at least one stage for each of the plurality of sub-tasks, each stage comprising:
      a holding area; and
      a scheduling policy;
   (b) receiving a plurality of requests for the task;
   (c) for each of the requests, storing in a work packet data for performing a sub-task of the task;
   (d) storing each work packet in the holding area of the at least one stage for the sub-task;
   (e) executing the sub-task on each of the work packets in the holding area in accordance with the scheduling policy of the at least one stage for the sub-task while refraining from executing other sub-tasks of the task, thereby maintaining locality of instructions and data in the cache; and
   (f) repeating steps c, d and e for each sub-task of the task until all of the sub-tasks of the task are completed for each request.

29. The computer-readable medium of claim 28, wherein each sub-task has a type of work packet defined for it, wherein the work packet defined for the sub-task includes data and functions for performing the sub-task.

30. The computer-readable medium of claim 28, wherein the holding area is a queue.

31. The computer-readable medium of claim 28, wherein the holding area is a stack.

32. The computer-readable medium of claim 28, wherein at least one of the executed work packets is a parent work packet, the method further comprising:
   creating a child work packet for the parent work packet; and performing a sub-task of the plurality of sub-tasks on the child work packet.

33. The computer-readable medium of claim 28, wherein step (c) further comprises storing in the work packet a pointer to the data for performing the sub task.

34. A computer-readable medium having stored thereon computer-executable instructions for a method of performing a task on a computer system having a cache, wherein the task comprises a plurality of sub-tasks, the method comprising:
   creating a plurality of instances of a stage for each sub-task, wherein each stage comprises:
      a holding area; and
      a scheduling policy;
   receiving a plurality of requests for the task;
   for each request, placing one or more work packets in the holding area, each work packet corresponding to an iteration of the sub-task required for the task and containing data for performing the sub-task; and
   performing the sub-task on each work packet in the holding area of the stage in accordance with the scheduling policy of the stage while refraining from executing other sub-tasks of the task, thereby maintaining data locality in the cache for the sub-task.

35. The computer-readable medium of claim 34, wherein the stage permits an instance of itself to be created on only a single processor in the computer system at a time.

36. The computer-readable medium of claim 34, wherein the stage includes a local data area, and wherein the stage regulates which processor is permitted to create an instance of it based on the part of the local data area required to be accessed.

37. The computer-readable medium of claim 34, wherein, for at least one of the stage instances created, there is at least one work packet that is a parent work packet, the method further comprising:
   creating a child work packet for the parent work packet;
   sending the child work packet to another stage instance; and;
   at the other stage instances, performing a sub-task of the plurality of sub-tasks on the child work packet.

38. The computer-readable medium of claim 34, wherein the holding area includes a stack and a queue, and the method further comprises: for each work packet received by at least one stage instance, putting the work packet in the stack if the work packet originated from the processor on which the instance of the stage is created, and putting the work packet in the queue if the work packet originated from another processor.

39. The computer-readable medium of claim 34, wherein each work packet contains at least one pointer to data for performing the sub-task.

* * * * *